US012120805B2

(12) United States Patent
Maeda et al.

(10) Patent No.: US 12,120,805 B2

(45) Date of Patent: Oct. 15, 2024

(54) HIGH-FREQUENCY HEATING APPARATUS

(71) Applicant: Panasonic Intellectual Property Management Co., Ltd., Osaka (JP)

(72) Inventors: Kazuki Maeda, Shiga (JP); Daisuke Hosokawa, Shiga (JP); Yoshiharu Oomori, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 703 days.

(21) Appl. No.: 17/420,408

(22) PCT Filed: Feb. 3, 2020

(86) PCT No.: PCT/JP2020/003934

§ 371 (c)(1),
(2) Date: Jul. 2, 2021

(87) PCT Pub. No.: WO2020/166410

PCT Pub. Date: Aug. 20, 2020

(65) Prior Publication Data

US 2022/0086971 A1 Mar. 17, 2022

(30) Foreign Application Priority Data

Feb. 13, 2019 (JP) ................................ 2019-023095

(51) Int. Cl.
*H05B 6/72* (2006.01)
*H05B 6/68* (2006.01)
(Continued)

(52) U.S. Cl.
CPC ................ *H05B 6/72* (2013.01); *H05B 6/68* (2013.01); *H05B 6/70* (2013.01); *H05B 6/76* (2013.01)

(58) Field of Classification Search
CPC ... H05B 6/68; H05B 6/70; H05B 6/72; H05B 6/76; H05K 3/3431
(Continued)

(56) References Cited

U.S. PATENT DOCUMENTS 3,366,769 A 1/1968 Lima
2014/0063676 A1 3/2014 Sigalov et al.
(Continued)

FOREIGN PATENT DOCUMENTS

CN 104373971 2/2015
EP 2136605 B1 * 2/2015 ............ H05B 6/725
(Continued)

OTHER PUBLICATIONS

International Search Report of PCT application No. PCT/JP2020/003934 dated Mar. 24, 2020.
(Continued)

*Primary Examiner* — Quang T Van
(74) *Attorney, Agent, or Firm* — Wenderoth, Lind & Ponack, L.L.P.

(57) ABSTRACT

A high-frequency heating apparatus includes heating chamber (1), generator (2), radiator (3), and controller (30). Heating chamber (1) has a wall surface including metal, and accommodates object (4) to be heated. Generator (2) generates high-frequency power at any frequency in a band of 2.4 GHz to 2.5 GHz. Radiator (3) includes loop antenna (3) including a plurality of loop portions (3A, 3B), and radiates the high-frequency power generated by generator (2) to heating chamber (1). Controller (30) controls a frequency of the high-frequency power generated by generator (2). According to this aspect, a heating target can be uniformly heated or partially heated without a waveguide for transmitting high-frequency power.

9 Claims, 6 Drawing Sheets

(51) Int. Cl.
*H05B 6/70* (2006.01)
*H05B 6/76* (2006.01)

(58) Field of Classification Search
USPC ........ 219/738, 690, 691.692, 695, 697, 698, 219/709, 756, 748, 761
See application file for complete search history.

(56) References Cited

U.S. PATENT DOCUMENTS

| | | | | |
|---|---|---|---|---|
| 2015/0245424 | A1 | 8/2015 | Brill | |
| 2016/0249416 | A1 | 8/2016 | Elboim et al. | |
| 2018/0343713 | A1* | 11/2018 | Swiergon ................. | H05B 6/80 |
| 2018/0368215 | A1 | 12/2018 | Ikeda et al. | |

FOREIGN PATENT DOCUMENTS

| | | |
|---|---|---|
| JP | 49-046809 B | 12/1974 |
| JP | 59-029397 | 2/1984 |
| JP | 2005-124061 | 5/2005 |
| JP | 2013-201096 | 10/2013 |
| WO | 2017/022712 | 2/2017 |

OTHER PUBLICATIONS

Extended European Search Report issued Mar. 3, 2022 in corresponding European Patent Application No. 20756054.1.

* cited by examiner

HIGH-FREQUENCY HEATING APPARATUS

TECHNICAL FIELD

The present disclosure relates to a high-frequency heating apparatus including a high-frequency generator.

BACKGROUND ART

Conventionally, a high-frequency heating apparatus heats a heating target by high-frequency power supplied from a power supply port provided on a wall surface of a heating chamber. A high-frequency heating apparatus described in PTL 1 includes a plurality of power supply ports, and can change an amount of power radiated from each of the plurality of power supply ports. Thus, in the conventional high frequency heating apparatus, an electromagnetic field distribution in the heating chamber is changed with time to uniformly heat an object to be heated.

CITATION LIST

Patent Literature

PTL 1: Unexamined Japanese Patent Publication No. S59-29397

SUMMARY OF THE INVENTION

However, a conventional high-frequency heating apparatus needs a waveguide for guiding high-frequency power to a power supply port provided on a wall surface of a heating chamber. Consequently, a size of the apparatus is increased, or an energy loss occurs when high-frequency power is transmitted through the waveguide.

A high-frequency heating apparatus according to one aspect of the present disclosure includes a heating chamber, a generator, and a radiator. The heating chamber has a wall surface including metal, and is configured to accommodate a heating target. The generator generates high-frequency power. The radiator includes a loop antenna including a plurality of loop portions, and radiates the high-frequency power generated by the generator to the heating chamber.

According to this aspect, a heating target can be uniformly heated or partially heated without a waveguide for transmitting high-frequency power.

DESCRIPTION OF EMBODIMENTS

Figure 1:
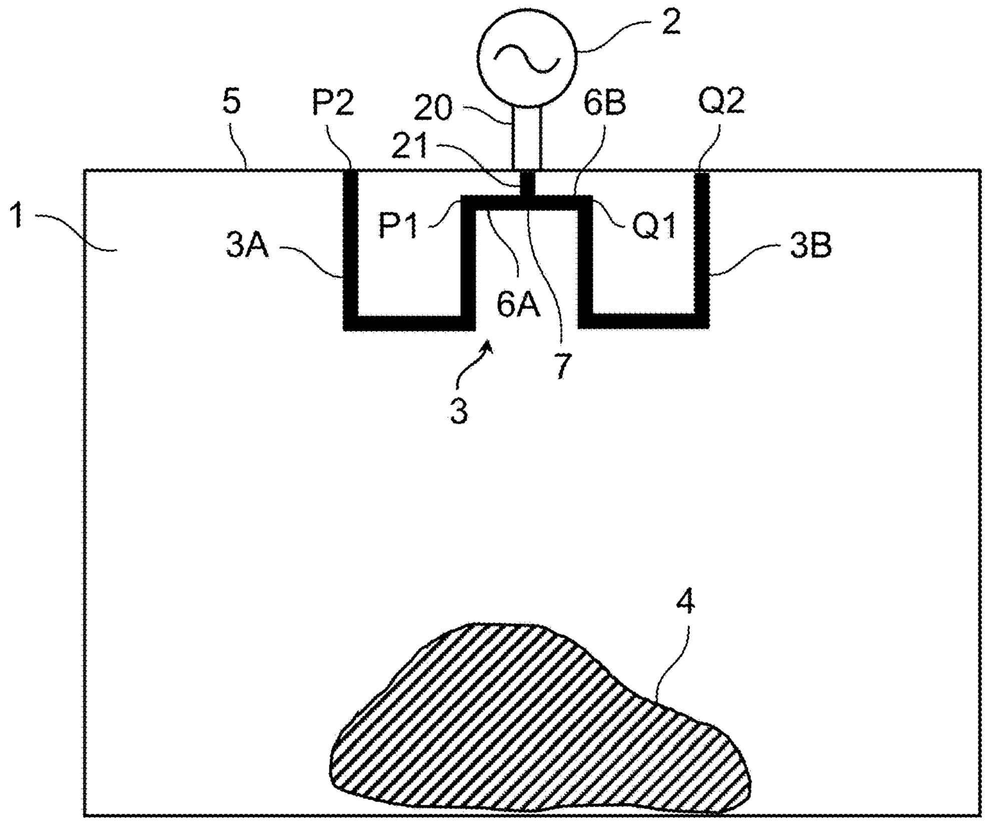
FIG. 1 is a diagram schematically showing a configuration of a high-frequency heating apparatus according to a first exemplary embodiment of the present disclosure.

A high-frequency heating apparatus according to a first aspect of the present disclosure includes a heating chamber, a generator, and a radiator. The heating chamber has a wall surface including metal, and is configured to accommodate a heating target. The generator generates high-frequency power. The radiator has a loop antenna including a plurality of loop portions, and radiates the high-frequency power generated by the generator to the heating chamber.

A second aspect of the present disclosure is based on the first aspect, and further includes a controller configured to control a frequency of the high-frequency power generated by the generator.

In a third aspect of the present disclosure based on the first aspect, the generator generates high-frequency power at any frequency in a band of 2.4 GHz to 2.5 GHz.

In a fourth aspect of the present disclosure based on the third aspect, the plurality of loop portions has different lengths from each other.

In a fifth aspect of the present disclosure based on the first aspect, each of the plurality of loop portions has a length equal to an integral multiple of half of a wavelength of the high-frequency power.

In a sixth aspect of the present disclosure based on the first aspect, the loop antenna includes a plurality of transmission lines each extending from a branch point to each of the plurality of loop portions, the branch point being supplied with the high-frequency power. The plurality of transmission lines are parallel to the wall surface of the heating chamber.

In a seventh aspect of the present disclosure based on the sixth aspect, a length of each of the plurality of transmission lines is ¼ or more and half or less of a wavelength $\lambda$ of the high-frequency power.

An eighth aspect of the present disclosure is based on the first aspect, and further includes a choke structure body disposed outside the heating chamber above the loop antenna to protrude from the heating chamber. The choke structure body includes a slit provided on a surface that is in contact with the wall surface of the heating chamber, and a cavity extending from the slit.

In a ninth aspect of the present disclosure based on the eighth aspect, the cavity has a depth of approximately ¼ of a wavelength $\lambda$ of the high-frequency power.

In a tenth aspect of the present disclosure based on the eighth aspect, the slit has a width of 1 mm or more and 5 mm or less.

In an eleventh aspect of the present disclosure based on the eighth aspect, the slit has a length longer than half of a wavelength λ of the high-frequency power.

In a twelfth aspect of the present disclosure based on the eighth aspect, the choke structure body is disposed to intersect with the loop antenna with the wall surface sandwiched between the choke structure body and the loop antenna.

Hereinafter, exemplary embodiments of the present disclosure are described with reference to the drawings. In all of the following drawings, the same numerals are given to the same components or corresponding components, and the redundant description is omitted.

First Exemplary Embodiment

FIG. 1 schematically shows a configuration of a high-frequency heating apparatus according to a first exemplary embodiment of the present disclosure. FIG. 1 is a view of the high-frequency heating apparatus according to this exemplary embodiment viewed from the front. As shown in FIG. 1, the high-frequency heating apparatus of the first exemplary embodiment includes heating chamber 1, generator 2, and loop antenna 3.

Wall surface 5 of heating chamber 1 is made of a conductive material such as enamel or iron. Generator 2 includes a semiconductor amplifier, and generates high-frequency power such as a microwave. The high-frequency power generated by generator 2 is supplied from branch point 7 to loop antenna 3 via coaxial line 20 and connector 21.

Loop antenna 3 is a radiator for radiating high-frequency power to heating chamber 1. The high-frequency power radiated by loop antenna 3 heats heating target 4 placed in heating chamber 1. Loop antenna 3 is generally made of copper. However, loop antenna 3 is not necessarily made of copper as long as it can conduct high frequency electromagnetic waves.

Figure 2:
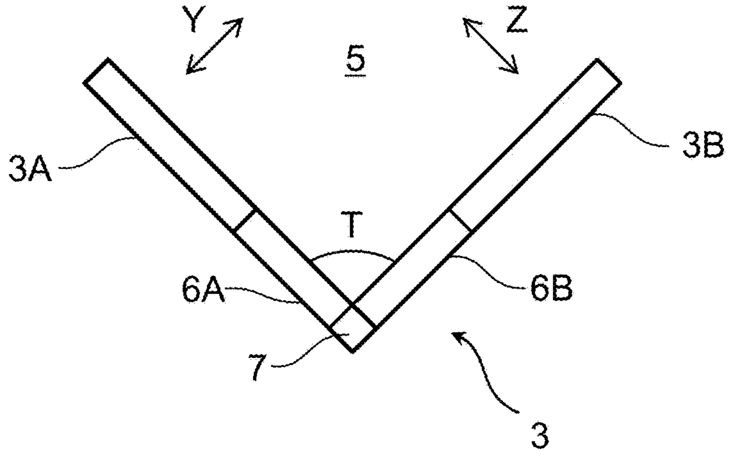
FIG. 2 is a diagram schematically showing a configuration of a loop antenna according to the first exemplary embodiment.

FIG. 2 is a view of upper wall surface 5 of heating chamber 1 viewed from below to show a configuration of loop antenna 3. As shown in FIGS. 1 and 2, loop antenna 3 includes two transmission lines (transmission lines 6A and 6B) and two loop portions (loop portions 3A and 3B).

Transmission line 6A has one end connected to connector 21 at branch point 7, and extends in parallel to wall surface 5 of heating chamber 1. The other end of transmission line 6A is connected to loop portion 3A at connection point P1.

Transmission line 6B has one end connected to connector 21 at branch point 7, and extends in parallel to wall surface 5 of heating chamber 1 and in a direction different from transmission line 6A. An angle formed by transmission lines 6A and 6B is T. The other end of transmission line 6B is connected to loop portion 3B at connection point Q1.

Loop portion 3A has one end connected to transmission line 6A at connection point P1, and the other end connected to wall surface 5 at connection point P2. Loop portion 3A includes a transmission line extending perpendicular to wall surface 5 from connection point P1, a transmission line parallel to wall surface 5 and parallel to transmission line 6A, and a transmission line extending perpendicular to wall surface 5 from connection point P2.

Loop portion 3B has one end connected to transmission line 6B at connection point Q1, and the other end connected to wall surface 5 at connection point Q2. Loop portion 3B includes a transmission line extending perpendicular to wall surface 5 from connection point Q1, a transmission line parallel to wall surface 5 and parallel to transmission line 6B, and a transmission line extending perpendicular to wall surface 5 from connection point P2.

With the high-frequency power generated by generator 2, a high-frequency current flows into loop antenna 3. This high-frequency current excites an electromagnetic field. The electromagnetic field excited by loop portion 3A propagates perpendicular to a plane containing loop portion 3A (along the Y-axis of FIG. 2). The electromagnetic field excited by loop portion loop portion 3B propagates perpendicular to a plane containing loop portion 3B (along the Z-axis of FIG. 2).

When a frequency of the high-frequency power coincides with a resonance frequency with respect to a length of each of the transmission lines of loop portions 3A and 3B, radiant efficiency from loop antenna 3 to the inside of heating chamber 1 is increased. The length of the transmission line of loop portion 3A is a length of the transmission line constituting loop portion 3A from connection point P1 to connection point P2. The length of the transmission line of loop portion 3B is a length of the transmission line constituting loop portion 3B from connection point Q1 to connection point Q2.

In this exemplary embodiment, loop antenna 3 includes at least two loop portions having different excitation directions. Thus, high-frequency power can be radiated in a plurality of directions.

In this exemplary embodiment, loop antenna 3 includes two loop portions. However, the present disclosure is not limited to this. Also when loop antenna 3 includes three or more loop portions, the same effect can be achieved.

As shown in FIG. 2, when the angle T is smaller than 90°, or the angle T is larger than 270°, a difference in the excitation directions between loop portions 3A and 3B is small. Accordingly, electromagnetic field distributions generated by loop portions 3A and 3B in heating chamber 1 are similar to each other.

In this case, an electromagnetic field distribution covering the whole of heating target 4 in heating chamber 1 is not generated. As a result, an effect of uniformly heating is not achieved. That is to say, the angle T between loop portions 3A and 3B is preferably 90° or more and 270° or less.

Note here that in this exemplary embodiment, loop antenna 3 is provided on upper wall surface 5 of heating chamber 1. However, loop antenna 3 may be provided on the side wall surface of heating chamber 1.

Second Exemplary Embodiment

Figure 3:
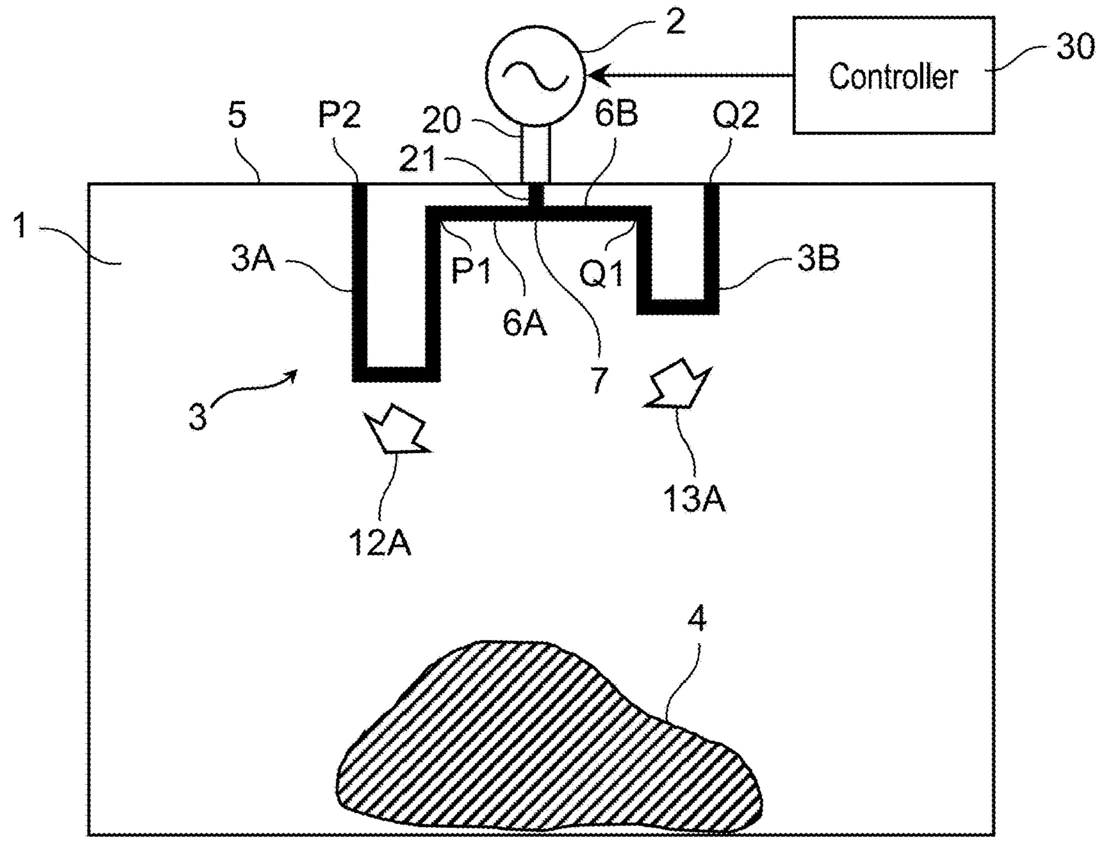
FIG. 3 is a diagram schematically showing a configuration of a high-frequency heating apparatus according to a second exemplary embodiment of the present disclosure.

FIG. 3 schematically shows a configuration of a high-frequency heating apparatus according to a second exemplary embodiment of the present disclosure. FIG. 3 is a diagram of the high-frequency heating apparatus of this exemplary embodiment viewed from the front.

The high-frequency heating apparatus of this exemplary embodiment includes controller 30 for controlling a frequency of high-frequency power generated by generator 2. In this exemplary embodiment, generator 2 outputs high-frequency power at any frequency in a band of 2.4 GHz to 2.5 GHz as the industrial, scientific and medical (ISM) radio bands.

A wavelength λ1 of high-frequency power at 2.4 GHz in free space is about 12.50 cm. A wavelength λ2 of the high-frequency power at 2.5 GHz in free space is about 12.00 cm. In this exemplary embodiment, a length of the transmission line of loop portion 3A is set at about half of the wavelength λ1. The length of the transmission line of loop portion 3B is set at about half of the wavelength λ2.

When controller 30 controls generator 2 such that the high-frequency power at 2.4 GHz is output, resonance is generated in loop portion 3A, and a high-frequency current flows mainly into loop portion 3A. As a result, the high-frequency power is mainly radiated from loop portion 3A to heating chamber 1 (see arrow 12A in FIG. 3).

When controller 30 controls generator 2 such that the high-frequency power at 2.5 GHz is output, resonance is generated in loop portion 3B, and a high-frequency current flows mainly into loop portion 3B. As a result, the high-frequency power is mainly radiated from loop portion 3B to heating chamber 1 (see arrow 13A in FIG. 3).

That is to say, when generator 2 outputs the high-frequency power at 2.4 GHz, heating target 4 placed near loop section 3A can be intensively heated. When generator 2 outputs the high-frequency power at 2.5 GHz, heating target 4 placed near loop section 3B can be intensively heated.

When generator 2 alternately outputs the high-frequency power at 2.4 GHz and the high-frequency power at 2.5 GHz at a predetermined time interval, the whole of heating target 4 can be uniformly heated. In this way, heating target 4 can be uniformly heated or partially heated.

As described above, in this exemplary embodiment, the length of the transmission line of loop portion 3A is set at about half of the wavelength λ1, and the length of the transmission line of loop portion 3B is set at about half of the wavelength λ2. However, the present disclosure is not necessarily limited to this. The same effect can be achieved, as long as the length of the transmission line of loop portion 3A is set at an integral multiple of about half of the wavelength λ1, and the length of the transmission line of loop portion 3B is set at an integral multiple of about half of the wavelength λ2.

Third Exemplary Embodiment

Figure 4:
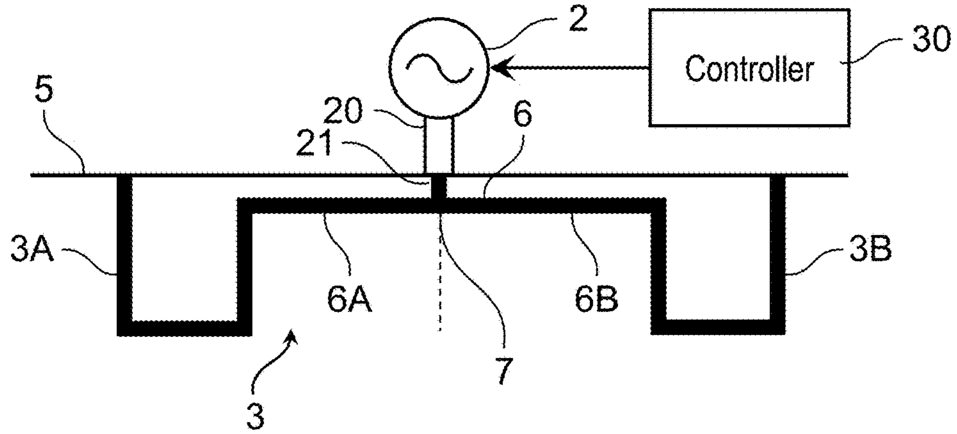
FIG. 4 is a diagram schematically showing a configuration in a vicinity of a wall surface of a heating chamber according to a third exemplary embodiment of the present disclosure.

FIG. 4 schematically shows a configuration in a vicinity of wall surface 5 of heating chamber 1 of a high-frequency heating apparatus according to a third exemplary embodiment of the present disclosure.

As shown in FIG. 4, in this exemplary embodiment, a length of each of transmission lines 6A and 6B is longer than that in the first exemplary embodiment. Specifically, the length of each of transmission lines 6A and 6B is set at about 5 cm.

When a length of each of transmission lines 6A and 6B is increased, a distance between loop portion 3A and loop portion 3B is increased. Therefore, interference between the two electromagnetic fields excited by loop portions 3A and 3B becomes smaller, and an electromagnetic field distribution in heating chamber 1 is changed. As a result, the heating efficiency is improved.

Note here that when a wavelength of high-frequency power is λ, a length of each of transmission lines 6A and 6B is desirably ¼ or more of the wavelength λ and half or less of the wavelength λ.

Fourth Exemplary Embodiment

Figure 5:
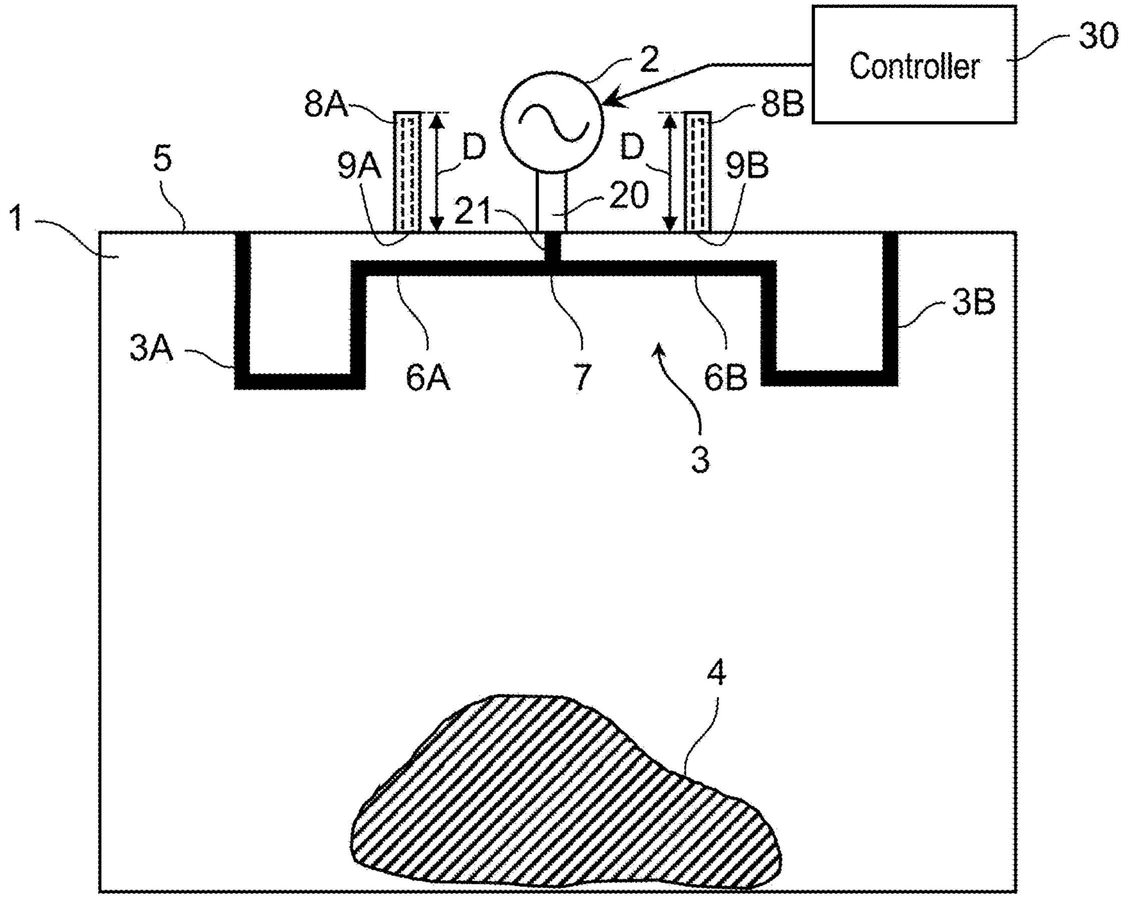
FIG. 5 is a diagram schematically showing a configuration of a high-frequency heating apparatus according to a fourth exemplary embodiment of the present disclosure.
Figure 6:
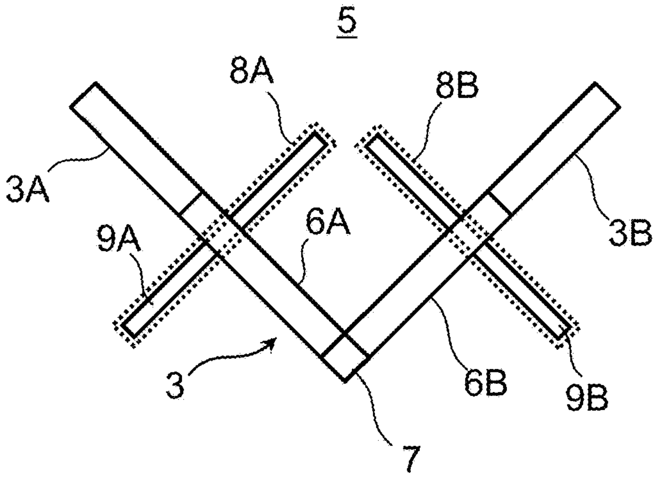
FIG. 6 is a diagram schematically showing a configuration of a loop antenna and a choke structure body according to the fourth exemplary embodiment.
Figure 7:
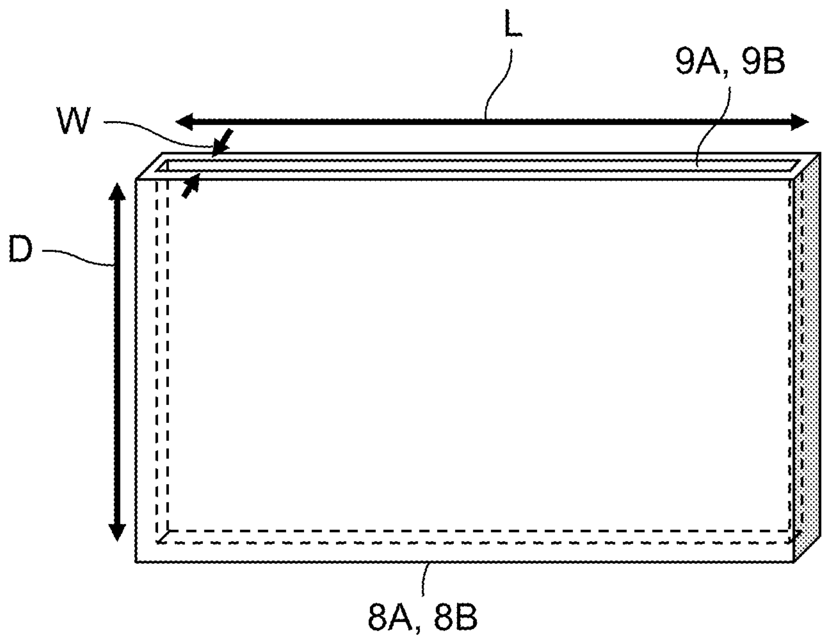
FIG. 7 is a perspective view of the choke structure body according to the fourth exemplary embodiment.

FIG. 5 schematically shows a configuration of a high-frequency heating apparatus according to a fourth exemplary embodiment of the present disclosure. FIG. 6 schematically shows a configuration of loop antenna 3 and choke structure bodies 8A and 8B according to this exemplary embodiment. FIG. 6 is a view of upper wall surface 5 of heating chamber 1 viewed from below to show the positional relation between loop antenna 3 and choke structure bodies 8A and 8B. FIG. 7 is a perspective view of choke structures 8A and 8B viewed obliquely from below.

As shown in FIG. 5, choke structure bodies 8A and 8B are disposed outside heating chamber 1 above loop antenna 3 to protrude from heating chamber 1. As shown in FIG. 7, each of choke structure bodies 8A and 8B is a metal body having a flat rectangular parallelepiped shape.

As shown in FIGS. 5 and 7, slits 9A and 9B having the same shape and same size are respectively provided on the surfaces of choke structure bodies 8A and 8B, which are in contact with wall surface 5 of heating chamber 1. Slits 9A and 9B have length L (size in the longitudinal direction) and width W (size in the lateral direction). Cavities having a depth D and extending from slits 9A and 9B respectively are provided inside choke structure bodies 8A and 8B.

Two opening portions having the same shape and same size as those of slits 9A and 9B are provided in wall surface 5 of heating chamber 1. Choke structure body 8A is disposed such that slit 9A faces one of the two opening portions of wall surface 5. Choke structure body 8B is disposed such that slit 9B faces the other of the two opening portions of wall surface 5. With this configuration, heating chamber 1 communicates to the cavities inside choke structure bodies 8A and 8B via slits 9A and 9B and two opening portions, respectively.

As shown in FIG. 6, transmission lines 6A and 6B extend orthogonal to each other. Loop portions 3A and 3B extend in the same directions as transmission lines 6A and 6B, respectively. As a result, loop portions 3A and 3B extend orthogonal to each other.

Choke structure body 8A is disposed to intersect with loop antenna 3 at substantially the center of choke structure body 8A with wall surface 5 sandwiched between choke structure body 8A and loop antenna 3. Choke structure body 8B is disposed to intersect with loop antenna 3 at substantially the center of choke structure body 8B with wall surface 5 sandwiched between choke structure body 8B and loop antenna 3. In this exemplary embodiment, transmission lines 6A and 6B are orthogonal to choke structure bodies 8A and 8B, respectively.

The high-frequency power generated by generator 2 flows through transmission lines 6A and 6B perpendicular to choke structure bodies 8A and 8B, respectively. When the depth D of the cavity of each of choke structure bodies 8A and 8B is ¼ of the wavelength λ of high-frequency power, impedance in the cavity of each of choke structures 8A and 8B viewed from slits 9A and 9B becomes infinite.

In this configuration, the high-frequency power at a frequency of c/λ (c is the speed of light) is totally reflected by choke structure bodies 8A and 8B. In other words, choke structure bodies 8A and 8B cut off the high-frequency power at a predetermined frequency so as not to supply loop portions 3A and 3B with the high-frequency power.

The cavity inside each of choke structure bodies 8A and 8B may be a straight shape in a depth direction as shown in FIG. 7, or may be a shape folded in the middle.

Each of choke structures 8A and 8B has higher power cutoff performance as the width W of each of slits 9A and 9B becomes narrower. However, when the width W is made to be too narrow, the electric field in the widthwise direction may tend to be too strong. On the contrary, when the width W is made to be too wide, the power cutoff performance is deteriorated. Therefore, the width W needs to be set in view of the relation between a use amount of electric power and the necessary power cutoff performance. Specifically, the width W is desirably 1 mm or more and 5 mm or less.

The length L of each of slits 9A and 9B is set to be longer than half of the wavelength λ of high-frequency power. When each of choke structures 8A and 8B is considered to be a rectangular waveguide, the maximum wavelength (in-pipe cutoff wavelength) of an electromagnetic wave that can pass through the waveguide is smaller than two times of the width W of each of slits 9A and 9B.

That is to say, when the width W of each of slits 9A and 9B is narrower than half of the wavelength λ, the electromagnetic wave cannot pass though the inside of choke structure bodies 8A and 8B. When the width W of each of slits 9A and 9B is made wider, a surface area of the cavity in each of choke structure bodies 8A and 8B is increased, increasing a length of a path of a current flowing along the inner wall of the cavity. Therefore, the cutoff frequency shifts to lower frequencies.

Figure 8:
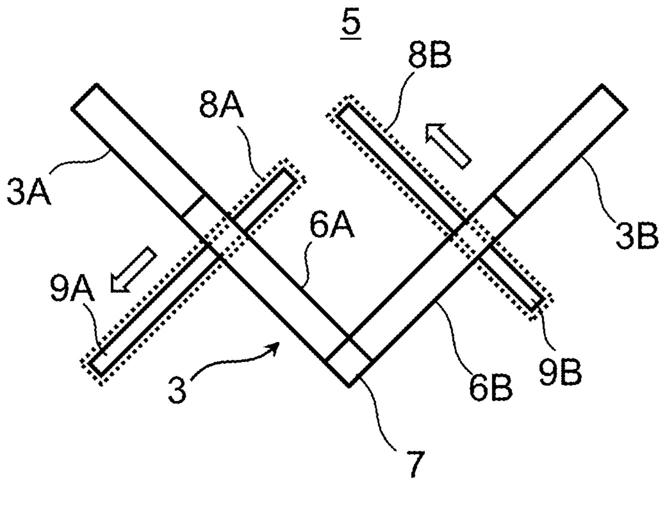
FIG. 8 is a configuration diagram showing a positional relation between the loop antenna and the choke structure body according to the fourth exemplary embodiment.

FIG. 8 schematically shows another configuration of loop antenna 3 and choke structure bodies 8A and 8B according to this exemplary embodiment. FIG. 8 is a view of upper wall surface 5 of heating chamber 1 viewed from below to show the positional relation between loop antenna 3 and choke structure bodies 8A and 8B.

As shown in FIG. 8, in this configuration, choke structure body 8A is moved perpendicular to transmission line 6A, and choke structure body 8B is moved perpendicular to transmission line 6B, respectively, from the configuration shown in FIG. 6. However, in this configuration, similar to the configuration shown in FIG. 6, choke structure bodies 8A and 8B overlap with transmission lines 6A and 6B of loop antenna 3, respectively.

In other words, in this configuration, choke structure body 8A is disposed to intersect with loop antenna 3 at a position other than the center with wall surface 5 sandwiched between choke structure body 8A and loop antenna 3. Choke structure body 8B is disposed to intersect with loop antenna 3 at a position other than the center of choke structure body 8B with wall surface 5 sandwiched between choke structure body 8B and loop antenna 3.

With this configuration, the cutoff frequency is changed, and cutoff accuracy is changed. As a result, the degree of freedom of arrangement of choke structure bodies 8A and 8B is improved, and slight displacement of the cutoff frequency can be adjusted.

Fifth Exemplary Embodiment

Figure 9:
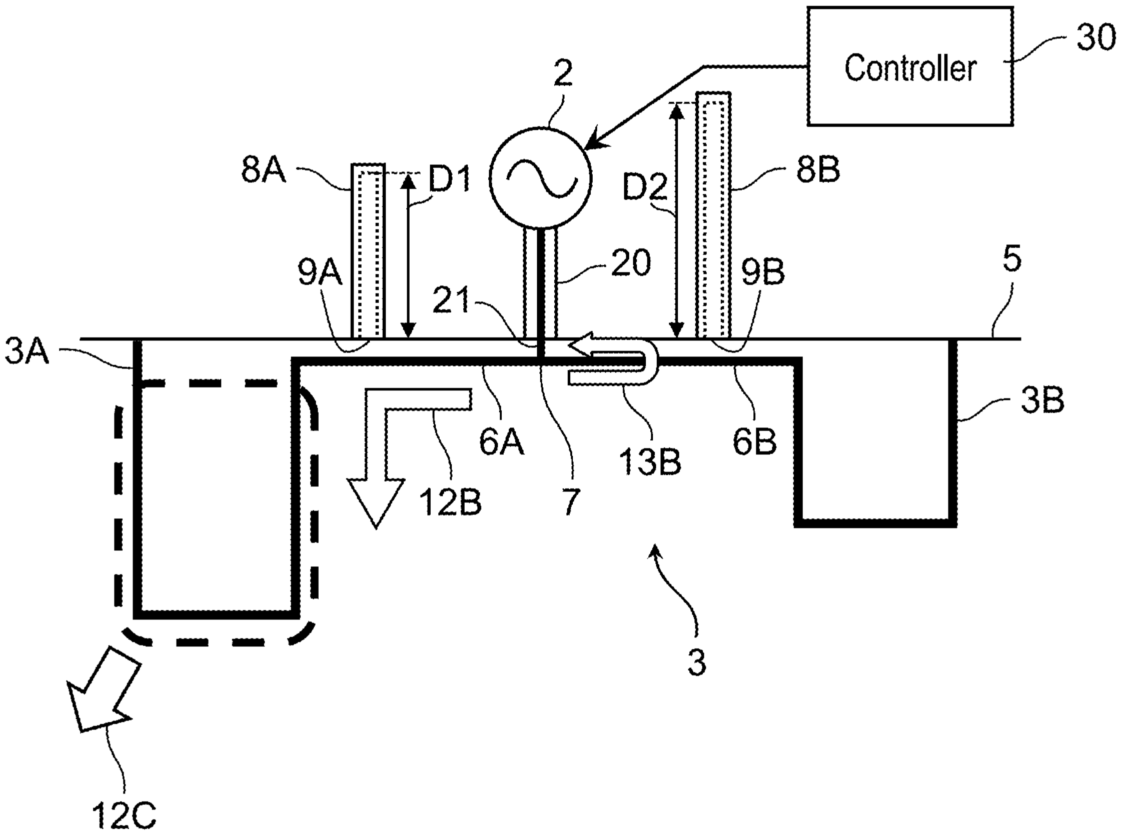
FIG. 9 is a diagram schematically showing a configuration in a vicinity of a wall surface of a heating chamber according to the fourth exemplary embodiment.

FIG. 9 schematically shows a configuration in a vicinity of wall surface 5 of heating chamber 1 according to the fifth exemplary embodiment of the present disclosure. As shown in FIG. 9, in this exemplary embodiment, a length of a transmission line of loop portion 3A is set to about half of a wavelength λ1 at high-frequency power at 2.4 GHz in free space. A length of the transmission line of loop portion 3B is set to half of a wavelength λ2 at high-frequency power at 2.5 GHz in free space.

The high-frequency heating apparatus of this exemplary embodiment includes choke structure bodies 8A and 8B disposed outside heating chamber 1 above loop antenna 3 to protrude from heating chamber 1. The depth D1 of a cavity of choke structure body 8A is approximately ¼ of the wavelength λ2. The depth D2 in the cavity of choke structure body 8B is approximately ¼ of the wavelength λ1.

When generator 2 outputs high-frequency power at a frequency of 2.4 GHz, resonance is generated in loop portion 3A as described above. Accordingly, most of current flows into loop portion 3A (see arrow 12B of FIG. 9). A part of the current flows toward loop portion 3B, but choke structure body 8A cuts off and reflects almost all the current (see arrow 13B of FIG. 9). As a result, almost all the current flow into loop portion 3A, and high-frequency power is radiated from loop portion 3A (see arrow 12C of FIG. 9).

In this exemplary embodiment, the shortest distance between branch point 7 and slit 9B is set to approximately ¼ of the wavelength λ1. Therefore, a phase of the current reflected by choke structure body 8B becomes the same as the phase of the current directly moving from generator 2 to loop portion 3A. Thus, the current flowing into loop portion 3A is strengthened.

The shortest distance between branch point 7 and slit 9A is set at approximately ¼ of the wavelength λ2. Therefore, when generator 2 outputs high-frequency power of a frequency of 2.5 GHz, on the contrary to the above, almost all the current flows into loop portion 3B, and high-frequency power is radiated from loop portion 3B.

Figure 10A:
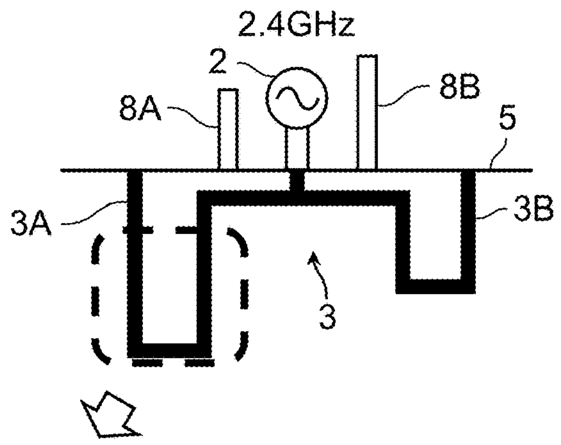
FIG. 10A is a diagram schematically showing a state in which a loop antenna radiates high-frequency power at a frequency of 2.4 GHz.
Figure 10B:
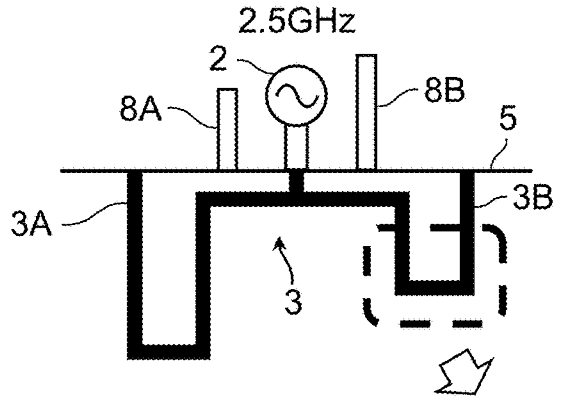
FIG. 10B is a diagram schematically showing a configuration of a state in which the loop antenna radiates high-frequency power at a frequency of 2.5 GHz.
Figure 10C:
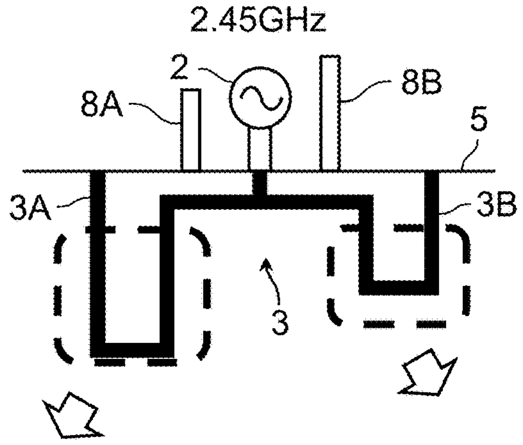
FIG. 10C is a diagram schematically showing a configuration of a state in which the loop antenna radiates high-frequency power at a frequency of 2.45 GHz.

FIG. 10A schematically shows a state in which the loop antenna radiates high-frequency power at a frequency of 2.4 GHz. FIG. 10B schematically shows a state in which the loop antenna radiates high-frequency power at a frequency of 2.5 GHz. FIG. 10C schematically shows a state in which the loop antenna radiates high-frequency power at a frequency of 2.45 GHz.

As shown in FIG. 10A, in the case of high-frequency power at a frequency of 2.4 GHz, choke structure body 8B cuts off almost all the high-frequency power. As a result, high-frequency power is radiated from loop portion 3A.

As shown in FIG. 10B, in the case of high-frequency power at a frequency of 2.5 GHz, choke structure body 8A cuts off almost all the high-frequency power. As a result, high-frequency power is radiated from loop portion 3B.

As shown in FIG. 10C, in the case of high-frequency power at a frequency of 2.45 GHz, neither choke structure body 8A nor choke structure body 8B can cut off high-frequency power. As a result, high-frequency power is radiated from both loop portions 3A and 3B substantially equally.

In this way, by changing the frequency of the high-frequency power, the high-frequency power can be radiated into heating chamber 1 in different patterns. Thus, an electromagnetic field distribution can be changed, a heating target can be uniformly heated or partially heated.

INDUSTRIAL APPLICABILITY

A high-frequency heating apparatus according to the present disclosure can be applied to a heating apparatus, garbage disposer, and the like, using dielectric heating.

REFERENCE MARKS IN THE DRAWINGS

1 heating chamber
2 generator
3 loop antenna
3A, 3B loop portion
4 object to be heated
5 wall surface
6A, 6B transmission line
7 branch point
8A, 8B choke structure body
9A, 9B slit
12A, 12B, 12C, 13A, 13B arrow
20 coaxial line
21 connector
30 controller

The invention claimed is:

1. A high-frequency heating apparatus comprising:

a heating chamber having a wall surface including metal and being configured to accommodate a heating target;

a generator configured to generate high-frequency power, and a radiator having a loop antenna including a plurality of loop portions, and configured to radiate the high-frequency power generated by the generator to the heating chamber; and a controller configured to control a frequency of the high-frequency power generated by the generator, wherein the loop portions have different lengths from each other, each of the plurality of loop portions has a length equal to an integral multiple of half of a wavelength of the high-frequency power, the controller is configured to cause the generator to output the high-frequency power at a frequency at which resonance is generated in one of the plurality of loop portions, so that the high-frequency power is radiated from the one of the plurality of loop portions, and the controller is configured to cause the generator to output the high-frequency power at a frequency at which resonance is generated in another of the plurality of loop portions, so that the high-frequency power is radiated from the another of the plurality of loop portions.

2. The high-frequency heating apparatus according to claim 1, wherein the generator is configured to generate the high-frequency power at any frequency in a band of 2.4 GHz to 2.5 GHz.

3. The high-frequency heating apparatus according to claim 1, wherein the loop antenna further includes a plurality of transmission lines each extending from a branch point to one of the plurality of loop portions, the branch point being supplied with the high-frequency power, and the plurality of transmission lines being parallel to the wall surface of the heating chamber.

4. The high-frequency heating apparatus according to claim 3, wherein a length of each of the plurality of transmission lines is ¼ or more and half or less of a wavelength of the high-frequency power.

5. The high-frequency heating apparatus according to claim 1, further comprising a choke structure body disposed outside the heating chamber above the loop antenna to protrude from the heating chamber, wherein the choke structure body includes a slit provided on a surface that is in contact with the wall surface of the heating chamber, and a cavity extending from the slit.

6. The high-frequency heating apparatus according to claim 5, wherein the cavity has a depth of approximately ¼ of a wavelength of the high-frequency power.

7. The high-frequency heating apparatus according to claim 5, wherein the slit has a width of 1 mm or more and 5 mm or less.

8. The high-frequency heating apparatus according to claim 5, wherein the slit has a length longer than half of a wavelength of the high-frequency power.

9. The high-frequency heating apparatus according to claim 5, wherein the choke structure body is disposed to intersect with the loop antenna with the wall surface sandwiched between the choke structure body and the loop antenna.

* * * * *